United States Patent
Kakinuma et al.

(10) Patent No.: US 10,496,236 B2
(45) Date of Patent: Dec. 3, 2019

(54) VEHICLE DISPLAY DEVICE AND METHOD FOR CONTROLLING VEHICLE DISPLAY DEVICE

(71) Applicant: TOYOTA JIDOSHA KABUSHIKI KAISHA, Toyota-shi, Aichi-ken (JP)

(72) Inventors: Shoji Kakinuma, Okazaki (JP); Hiroshi Shikata, Nisshin (JP); Ryota Hamabe, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 5 days.

(21) Appl. No.: 15/818,113

(22) Filed: Nov. 20, 2017

(65) Prior Publication Data

US 2018/0150201 A1    May 31, 2018

(30) Foreign Application Priority Data

Nov. 25, 2016 (JP) ................. 2016-229533

(51) Int. Cl.
*G06F 3/048* (2013.01)
*G06F 3/0481* (2013.01)
(Continued)

(52) U.S. Cl.
CPC .......... *G06F 3/04812* (2013.01); *B60K 35/00* (2013.01); *B60K 37/06* (2013.01); *B60K 2370/141* (2019.05); *B60K 2370/146* (2019.05); *B60K 2370/182* (2019.05); *B60K 2370/184* (2019.05); *B60K 2370/52* (2019.05); *G06F 3/1423* (2013.01); *G09G 5/08* (2013.01); *G09G 5/14* (2013.01); *G09G 2354/00* (2013.01); *G09G 2360/04* (2013.01); *G09G 2380/10* (2013.01)

(58) Field of Classification Search
CPC ..................................................... G06F 3/0481
See application file for complete search history.

(56) References Cited

U.S. PATENT DOCUMENTS

| 6,243,645 | B1 * | 6/2001 | Moteki | G01C 21/26 340/988 |
| 2007/0247717 | A1 * | 10/2007 | Konno | G02B 27/01 359/613 |

(Continued)

FOREIGN PATENT DOCUMENTS

| JP | 2008-009760 A | 1/2008 |
| JP | 2010-128619 A | 6/2010 |

(Continued)

*Primary Examiner* — David E Choi
(74) *Attorney, Agent, or Firm* — Hunton Andrews Kurth LLP

(57) ABSTRACT

A vehicle display device includes a display configured to show a first screen and a second screen and circuitry configured to control a position of a cursor on the first screen, on the second screen, and between the first and second screens. The circuitry moves the cursor from the first screen to the second screen if the cursor is located in a peripheral region when the user performs an operation to move the cursor from the first screen to the second screen. The circuitry restricts movement of the cursor from the first screen to the second screen if the cursor is located outside the peripheral region when the user performs an operation to move the cursor from the first screen to the second screen.

7 Claims, 3 Drawing Sheets

(51) Int. Cl.
    *B60K 37/06*     (2006.01)
    *B60K 35/00*     (2006.01)
    *G09G 5/14*     (2006.01)
    *G06F 3/14*     (2006.01)
    *G09G 5/08*     (2006.01)

(56) References Cited

U.S. PATENT DOCUMENTS

| | | | |
|---|---|---|---|
| 2007/0285364 A1* | 12/2007 | Nakagawa | H04N 5/44591 345/87 |
| 2010/0123659 A1* | 5/2010 | Beeman | G06F 3/0325 345/157 |
| 2011/0261201 A1 | 10/2011 | Fujii et al. | |
| 2012/0287042 A1* | 11/2012 | Chen | G06F 3/023 345/157 |
| 2015/0227335 A1 | 8/2015 | Hori et al. | |
| 2015/0309850 A1* | 10/2015 | Cheng | G06F 9/543 715/740 |
| 2017/0150059 A1* | 5/2017 | Hattar | G06F 1/1649 |
| 2018/0150201 A1* | 5/2018 | Kakinuma | B60K 37/06 |

FOREIGN PATENT DOCUMENTS

| | | |
|---|---|---|
| JP | 2015082270 A | 4/2015 |
| JP | 2015152964 A | 8/2015 |

\* cited by examiner

VEHICLE DISPLAY DEVICE AND METHOD FOR CONTROLLING VEHICLE DISPLAY DEVICE

CROSS-REFERENCE TO RELATED APPLICATION

The present application claims priority to Japanese Patent Application No. 2016-229533 filed on Nov. 25, 2016, which is incorporated herein by reference in its entirety.

BACKGROUND OF THE INVENTION

The present invention relates to a vehicle display device including a display capable of displaying a plurality of screens and a method for controlling the vehicle display device.

A vehicle display device known in the art uses a user interface such as a touch panel and a touch pad to perform, for example, an operation on a displayed map of a navigation system, an operation on an icon button, or a setting operation performed on displayed vehicle information.

When a user positions a cursor on any one of icon switches on a screen, the user needs to move the cursor, which is located at a certain position in the screen, toward an icon switch that is subject to operation. In particular, from safety viewpoints, it is desirable that a vehicle display device installed in a vehicle reduce the burden on the user resulting from operations other than driving. Japanese Laid-Open Patent Publication No. 2010-128619 describes an example of a vehicle display device capable of reducing the burden on the user resulting from operations other than driving.

The vehicle display device divides a display region into two regions and selects an icon switch shown in the region where a virtual pointer (cursor) is located. That is, the vehicle display device sets a virtual cursor that is moved in a screen by an input from the outside and not visually recognized from outside. Further, the vehicle display device includes a displaying means for displaying icon switches one at a time in which the icon switches include different processing contents corresponding to instructions and allocated respectively for a plurality of regions defined by dividing the display region. In addition, the vehicle display device includes a selecting means for selecting an icon switch shown in a region including the position of the virtual cursor and a processing means for outputting, to a predetermined device, information including the processing content corresponding to the icon switch selected by the selecting means.

The vehicle display device of Japanese Laid-Open Patent Publication No. 2010-128619 selects an icon switch shown in the region including the position of the virtual cursor and thus reduces the operation burden on the user.

Screens that have a low correlation with one another are often shown on the same display device. Screens having a low correlation may have a large difference in operability. Thus, when excessive movement of a cursor or the like causes an operation error across such two screens, the operation error may lead to a display result or the like that is awkward to the user. Further, free movement is required between two screens shown on the display device. That is, the display device that displays a plurality of screens needs to limit inadvertent movement between screens while also allowing for free movement between the screens.

SUMMARY OF THE INVENTION

It is an object of the present invention to provide a vehicle display device that limits inadvertent movement between screens while also allowing for free movement between the screens.

A vehicle display device that achieves the above object includes a display configured to show a first screen and a second screen and circuitry configured to control a position of a cursor on the first screen, on the second screen, and between the first and second screens in accordance with movement of the cursor by a user. The position of the cursor indicates an operation position on the display. The circuitry is configured to move the cursor from the first screen to the second screen if the cursor is located in a peripheral region including a boundary of the first screen and the second screen when the user performs an operation to move the cursor from the first screen to the second screen, and the circuitry is configured to restrict movement of the cursor from the first screen to the second screen if the cursor is located outside the peripheral region when the user performs an operation to move the cursor from the first screen to the second screen.

A method for controlling a vehicle display device that achieves the above object includes showing a first screen and a second screen on a display, controlling a position of a cursor on the first screen, on the second screen, and between the first and second screens in accordance with movement of the cursor by a user, with the position of the cursor indicating an operation position on the display, moving the cursor from the first screen to the second screen if the cursor is located in a peripheral region including a boundary of the first screen and the second screen when the user performs an operation to move the cursor from the first screen to the second screen, and restricting movement of the cursor from the first screen to the second screen if the cursor is located outside the peripheral region when the user performs an operation to move the cursor from the first screen to the second screen.

A vehicle display device that achieves the above object includes a first display and a second display, each configured to display a screen, and circuitry configured to control a position of a cursor on the first display, on the second display, and between the first and second displays in accordance with movement of the cursor by a user. The position of the cursor indicates an operation position on one of the first and second displays. The circuitry is configured to move the cursor from the first display to the second display if the cursor is located in a region including an end of the screen shown on the first display when the user performs an operation to move the cursor from the first display to the second display, and the circuitry is configured to restrict movement of the cursor from the first display to the second display if the cursor is located outside the region including the end when the user performs an operation to move the cursor from the first display to the second display.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a vehicle display device will now be described with reference to FIGS. 1 to 4. The vehicle display device of the present embodiment is installed in a vehicle 1 (refer to FIG. 6).

The vehicle display device of the present embodiment will now be described in outline.

The vehicle display device includes a display control unit 20 and a display 30. The display control unit 20 is connected to a touch pad 10 that is a device on which a user performs an input operation. The display 30 displays a screen, a cursor, and the like that are output from the display control unit 20.

Figure 1:
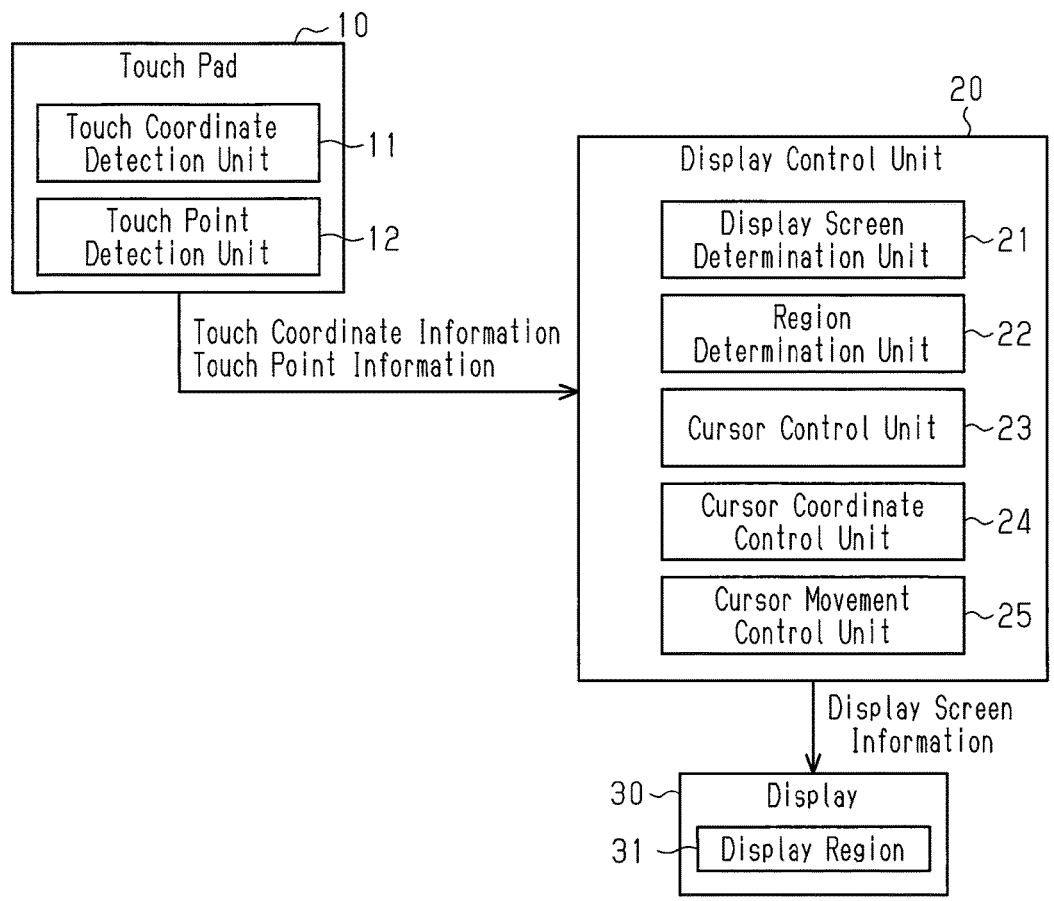
FIG. 1 is a schematic block diagram showing the configuration of one embodiment of a vehicle display device.
Figure 2:
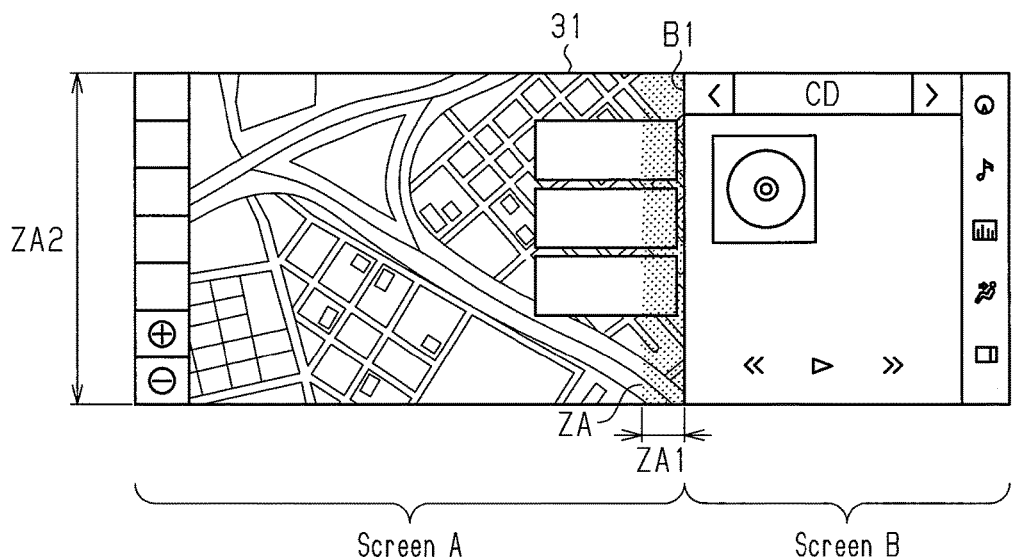
FIG. 2 is a diagram showing an example of a screen in which movement of a cursor is controlled in the vehicle display device of FIG. 1.
Figure 6:
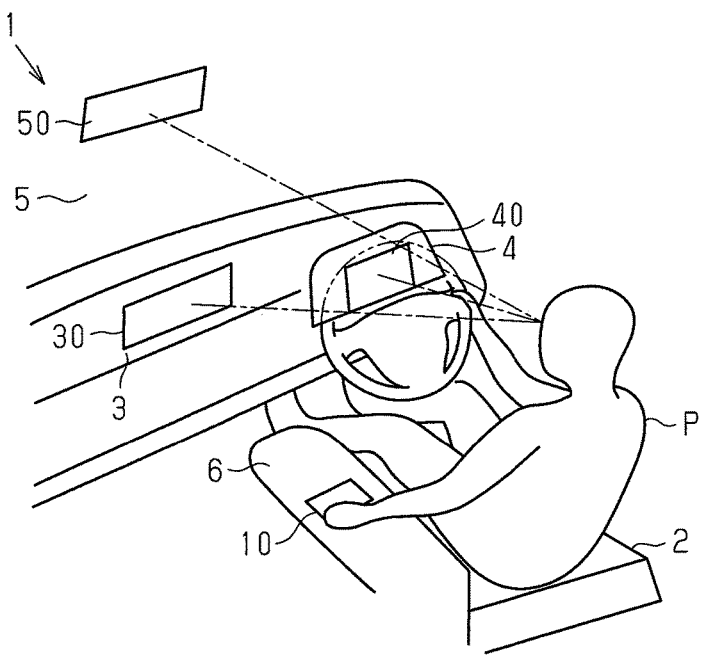
FIG. 6 is a schematic view showing an example including a single operation unit and a plurality of displays in the vehicle display device of FIG. 5.

The display 30 is located at an instrument panel 3 (refer to FIG. 6) where the display 30 is easily seen by a user P (FIG. 6) who sits in a driver seat 2 (refer to FIG. 6). The display 30 includes a display region 31 that displays an image. The display region 31 displays one or more screens. The display region 31 is formed from liquid crystal or the like. The screen includes a collection of images required for provided functions. In FIG. 2, for example, the display region 31 displays screen A that mainly includes a map image and screen B that includes various operation icon images.

The touch pad 10 is located in a center console 6 (refer to FIG. 6) or the like where the user P easily operates the touch pad 10 with a fingertip. The touch pad 10 detects, as operation information, coordinates (touch coordinates) and the number of touch points at a portion of the touch pad 10 touched by the user P and outputs the detected operation information to the display control unit 20. Further, the touch pad 10 is located at a position of the vehicle spaced apart from the display 30. Although the touch pad 10 is located at a position where the user P easily operates the touch pad 10, it is not easy for the user P to operate the touch pad 10 while viewing the touch pad 10 when the user P is driving the vehicle. Thus, it is difficult for the user P to operate the touch pad 10 with high accuracy under a usage environment of the vehicle.

The display control unit 20 controls an image shown in the display region 31 of the display 30. That is, the display control unit 20 inputs a screen shown in the display region 31 to the display 30. More specifically, the display control unit 20 receives screens that are output from various output devices (not shown) such as a navigation system, a media device that replays a television, a radio, music, and the like, a device that provides a notification of a vehicle state, or a device that outputs video taken with an onboard vehicle camera. Further, the display control unit 20 has the display 30 display one or more screens selected from the received screens.

In addition, the display control unit 20 controls the position of a single cursor shown in the display region 31 of the display 30. The display control unit 20 controls the position of the cursor shown in the display region 31 of the display 30 in accordance with movement of the cursor by the user through the touch pad 10.

In the present embodiment, when the display control unit 20 detects that the movement of a cursor by the user is an operation that moves the cursor from a screen of a plurality of screens on which the cursor is arranged out of the screen, the display control unit 20 restricts movement of the moved cursor out of the screen on which the cursor is arranged. That is, since the display control unit 20 restricts movement of the moved cursor out of the screen on which the cursor is arranged, the display control unit 20 limits inadvertent movement of the cursor out of the screen even if the accuracy of the movement by the user is low. Thus, the display control unit 20 allows the user to continue a screen operation while maintaining the operation feel of the cursor and the atmosphere of the screen.

Further, when the display control unit 20 detects that the movement of the cursor by the user is an operation that allows for movement of the cursor from a screen on which the cursor is arranged out of the screen, the display control unit 20 moves the cursor from the screen on which the cursor is arranged out of the screen. Thus, when the user wants to move the cursor out of the screen on which the cursor is arranged, the operation that allows for movement of the cursor out of the screen enables movement of the cursor to another screen.

The vehicle display device of the present embodiment will now be described in detail.

The vehicle display device includes the display control unit 20 connected in a manner allowing for communication with the touch pad 10 and the display 30 that receives display screen information output from the display control unit 20. The display screen information includes position information of one or more screens shown in the display region 31 and a single cursor. The screen includes one or more objects so that each device provides objective functions. The object is an element that forms an image and includes an icon switch (button) receiving an operation, a map display region in which various operations can be performed, and the like. The cursor is a mark that indicates an operation position on the screen. Instead, the cursor may be a sign indicating that a focus is set on an operation subject.

The touch pad 10 and the display control unit 20 are connected by, for example, an onboard vehicle network. A communication message can be transmitted and received between the devices connected to the onboard vehicle network. For example, a controller area network (CAN) protocol is used as the communication protocol for the onboard vehicle network. The onboard vehicle network may include a communication path that performs wireless communication or a path routed to another network though a gateway or the like.

The touch pad 10 and the display control unit 20 each include a communication interface (not shown) for the CAN protocol and a plurality of message boxes (MBOX) that temporarily store a communication message. The touch pad 10 and the display control unit 20 transmit and receive a communication message using the communication interface and the MBOX.

The display control unit 20 and the display 30 are connected by an image signal line. The image signal line may be, for example, a leased line for image transmission or a signal line using a LAN of the ETHERNET (registered trademark) standard, which is a network through which image information can be transmitted.

The touch pad 10 includes a detection surface that receives a user operation. The touch pad 10 detects an operation of the detection surface and outputs operation information including the detected operation to the display control unit 20. More specifically, the touch pad 10 detects contact of a finger of the user, obtains touch coordinates obtained through a finger trace operation and changes of the touch coordinates, and outputs the obtained touch coordinates and the changes to the display control unit 20 as operation information. As described above, the touch pad 10 is located in the center console 6 (refer to FIG. 6) that is easily operated by the user with a fingertip. The cursor shown on the display 30 is moved in accordance with an operation of the touch pad 10. The touch pad 10 is located at a position where the touch pad 10 is easily operated by the user, and the display 30 is located at a position where the display 30 is easily seen by the user. Thus, the touch pad 10 and the display 30 are located at positions of the vehicle that are spaced apart from each other.

The touch pad 10 includes a touch coordinate detection unit 11 and a touch point detection unit 12, each of which includes a circuit that detects an operation performed by the user. The touch pad 10 outputs the operation detected by the touch coordinate detection unit 11 and the touch point detection unit 12 to the display control unit 20 as the operation information. The operation information includes touch coordinate information detected by the touch coordinate detection unit 11 and touch point information detected by the touch point detection unit 12. The touch coordinate information includes a touch start coordinate, a touch end coordinate, and changes of a touch coordinate. The touch point information includes the number of portions that are simultaneously touched (number of touch points) and the number of times the screen is touched. The touch coordinate detection unit 11 can detect a touch start coordinate, a touch end coordinate, and changes of a touch coordinate in real time (for example, less than or equal to 20 ms cycle). The touch point detection unit 12 can detect the number of touch points and changes of whether or not the screen is touched.

Further, it is preferred that the touch pad 10 have a coordinate optical resolution that is greater than or equal to a display optical resolution of the display region 31. When the operation optical resolution is finer than the display optical resolution, coordinate movement can be determined in a further preferred manner. Thus, an operation intention of the user is highly likely to be determined more precisely. In addition, it is preferred that the touch pad 10 have a uniform optical resolution and detection accuracy of a touch coordinate on the detection surface. If the detection accuracy differs in the middle and ends of the detection surface, an operation intention of the user may not be easily determined.

The display control unit 20 and the display 30 each include a microcomputer with a computing unit (CPU) and a storage unit. The computing unit executes a computing process in compliance with a program. More specifically, the computing unit may be formed as circuitry including (1) one or more dedicated hardware circuits such as ASIC, (2) one or more processors that operate in compliance with computer programs (software), or (3) a combination of (1) and (2). The storage unit may include a read-only memory (ROM) that stores a program, data, and the like and a volatile memory (RAM) that temporarily stores a computation result of the computing unit. The storage unit, or computer-readable medium, includes various applicable media that can be accessed by a versatile or dedicated computer. The display control unit 20 and the display 30 provide predetermined functions by reading a program stored in the storage device to the computing unit and executing the program. The display control unit 20 executes, for example, a process that outputs an image, a process that obtains an operation corresponding to an image, and a process that controls movement of a cursor in accordance with a user operation. The display 30 executes, for example, a process that displays an image.

The display control unit 20 receives screens from, for example, a navigation system (not shown), a media device that replays a television, a radio, music, and the like, a vehicle state notification device, and a capturing device that outputs movie of an onboard vehicle camera, selects the received screens in accordance with display conditions, and has the display 30 display the screens. When the display control unit 20 has the display 30 display a plurality of screens, the display control unit 20 specifies a region that displays each screen. For example, the display control unit 20 divides the display region 31 of the display 30 into two left and right regions and has the divided regions display different screens.

Further, the display control unit 20 performs movement control including selection of an operation subject, movement and positioning of a single cursor shown in the display region 31, and the like in accordance with operation information from the touch pad 10. The cursor position is an on-screen operation position in the display region 31.

The display control unit 20 includes a display screen determination unit 21 that determines the number of displayed screens and a region determination unit 22 that determines a region of each displayed screen. Further, the display control unit 20 includes a cursor control unit 23 that performs cursor control applied to each screen, a cursor coordinate control unit 24 that obtains a cursor position by a coordinate, and a cursor movement control unit 25 serving as a position control unit that controls movement of a cursor in accordance with movement of a cursor through the touch pad 10.

The display screen determination unit 21 determines that the number of screens shown on the display 30 is one or more. Further, when the cursor is moved over the end of a screen, the display screen determination unit 21 determines whether or not over-boundary control needs to be performed in accordance with the types of screens shown on the display 30. For example, the display screen determination unit 21 determines that over-boundary line control needs to be performed in a display state in which a plurality of screens are shown. In a different display state, for example, in a display state in which only a single screen is shown, the display screen determination unit 21 determines that the over-boundary line control does not need to be performed.

The region determination unit 22 determines a position of a boundary line relative to a plurality of screens. In accordance with the types of displayed screens, the region determination unit 22 determines at which position of the display region 31 the screens are divided and sets a boundary line. Further, the region determination unit 22 sets a peripheral region used to determine whether or not a cursor is allowed to move over a boundary line with over-boundary line control. As described below, the peripheral region is set so as to extend along a boundary line and include the boundary line.

Figure 3:
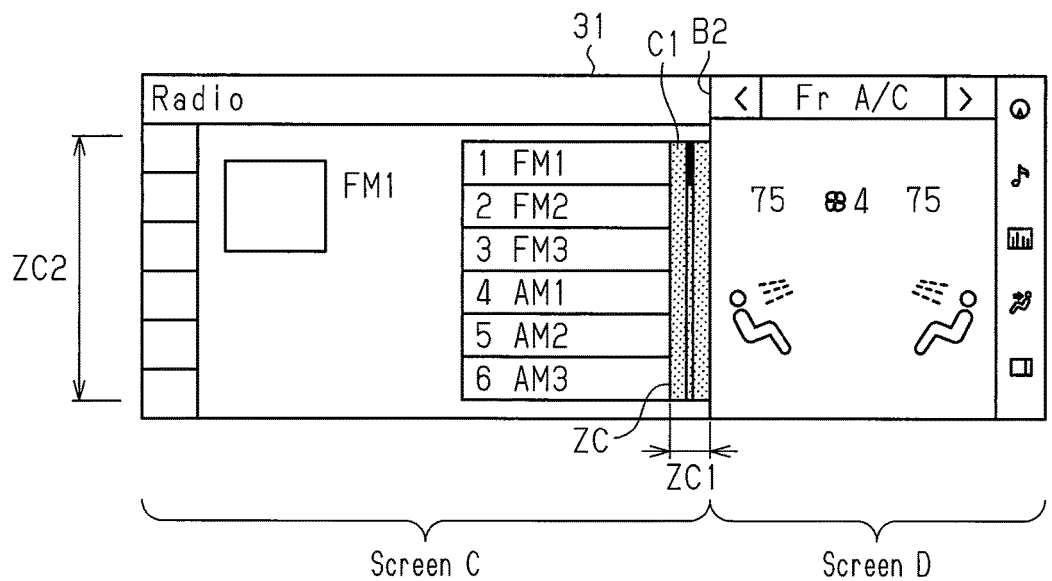
FIG. 3 is a diagram showing another example of a screen in which movement of the cursor is controlled in the vehicle display device of FIG. 1.

For example, as shown in FIG. 2, when the cursor is located on screen A, the region determination unit 22 sets a peripheral region ZA extending along a boundary line B1 between screen A and screen B and including the boundary line B1. The peripheral region ZA is set to extend over a predetermined width ZA1, for example, a width of 15 dots, from the boundary line B1 toward the inner side of screen A. Further, the peripheral region ZA is set to have a predetermined height ZA2 in a height-wise direction of screen A. In addition, for example, as shown in FIG. 3, when the cursor is located on screen C, the region determination unit 22 sets the predetermined region ZA so as to include the boundary line B1 and a slider C1, which is an object that is most proximate to a boundary line B2 between screen C and screen D. The slider C1 is located adjacent to the boundary line B2. Thus, a peripheral region ZC is set to have the width ZC1 of the slider C1, for example, a width of 15 dots, and the height ZC2 of the slider C1. When the cursor is located on screen B or D, the peripheral region is set to extend from the boundary line B1 or B2 toward the inner side of screen B or D. Screen C of FIG. 3 displays a partial list of radio station selection buttons ("1 FM1," "2 FM2," . . . "6 AM3"). The slider C1 is an object corresponding to a position (page position) in the vertical direction of a currently shown part of a list of all of the radio station selection buttons. The slider C1 can be moved in the vertical direction to change the shown part of the list of radio station selection buttons. For example, when the slider C1 is moved downward from the position shown in FIG. 3, the shown part of the list of radio station selection buttons changes from "1 to 6" to, for example, "2 to 7," "3 to 8," . . . .

The cursor control unit 23 controls cursor actions on screens in accordance with the types of cursor control applied to the screens. For example, the cursor control unit 23 applies free cursor control to a display screen such as a map screen or a browser screen that requires an operation at a certain position of the display region. The free cursor control is control in which a touch coordinate becomes a cursor coordinate. Further, for example, the cursor control unit 23 performs, on another screen, an operation subject movement cursor control that identifies a touch coordinate based on operation information from the touch pad 10, moves the cursor to an object such as a suitable icon switch (button) proximate to the identified touch coordinate, and sets a focus on the cursor.

The cursor coordinate control unit 24 determines the position of a cursor shown in a display region 41 and converts the position of the cursor from a coordinate system of the display region 41 to a coordinate system of each screen. Further, the cursor coordinate control unit 24 notifies a control device or the like that displays the screen of the position of the cursor converted to the coordinate system of each screen. Additionally, the cursor coordinate control unit 24 may notify the control device or the like of the types of cursor operations such as tap, double tap, swipe, pinch-in, and pinch-out in addition to the position of the cursor converted to the coordinate system of each screen.

The cursor movement control unit 25 controls movement of the cursor in the display region 31. The cursor movement control unit 25 moves the position of the cursor in the display region 31 based on movement information obtained from the touch pad 10. This moves the position of the cursor in the display region 31 in correspondence with an operation performed on the touch pad 10.

Further, in the present embodiment, when the display screen determination unit 21 determines that the over-boundary line control needs to be performed, the cursor movement control unit 25 applies the over-boundary line control to cursor movement as necessary. The cursor movement control unit 25 determines whether or not the over-boundary line control needs to be performed based on a cursor movement history in the display region 31. In detail, the cursor movement control unit 25 determines whether or not the over-boundary line control needs to be performed based on the coordinates of a touch operation start point in a single trip that is an operation when a fingertip that is in contact with the detection surface is moved without releasing the fingertip from the detection surface. In more detail, the cursor movement control unit 25 applies the over-boundary line control under the condition that the touch operation start point is located outside the peripheral region ZA and does not apply the over-boundary line control under the condition that the touch operation start point is located in the peripheral region ZA. When the cursor movement control unit 25 applies the over-boundary line control, the cursor movement control unit 25 performs the control so that the movement destination of the cursor does not move out of the screen including the coordinates of a touch start point. For example, when the coordinates of a touch end point are located on the screen including the coordinates of the touch start point, the position of the cursor moves to the coordinates of the touch end point. When the coordinates of the touch end point are located out of the screen including the coordinates of the touch start point, the cursor moves to the position on the screen including the coordinates of the touch start point on a path from the coordinates of the touch start point to the coordinates of the touch end point. The position where the cursor moves may be a position on the path, for example, the coordinates of the touch start point (where cursor does not move), the inside of the peripheral region ZA, or an end of the screen (intersection of boundary line of screen and path).

When the over-boundary line control is invalid, the cursor movement control unit 25 moves the position of the cursor to the coordinates of the touch end point. The movement is performed when, for example, the coordinates of the touch start point and the coordinates of the touch end point are located on the same screen.

Further, when the coordinates of the touch start point are located in the peripheral region ZA of the screen, the cursor movement control unit 25 does not apply the over-boundary line control to cursor movement. Thus, even when the coordinates of the touch end point are located in or out of the screen including the coordinates of the touch start point, the position of the cursor is moved to the coordinates of the touch end point. This restricts movement of the position of the cursor between screens that would be caused by an inadvertent operation and allows for movement of the position of the cursor between the screens when necessary.

The action of the cursor of the present embodiment will now be described with reference to FIGS. 2 and 3.

FIG. 2 shows an example of a screen when free cursor control is performed.

The display region 31 is divided into two regions located at the left and right sides of the plane of the drawing. The left region of the two regions displays a map display screen where free cursor control is performed, and the right region of the two regions displays a music replay screen where free cursor control is performed. When the cursor is located in the left region, movement of the cursor is controlled in the manner described below. For example, when the cursor is located in the peripheral region ZA arranged along the boundary line B1 of the left region, the cursor can move over the boundary line B1 to screen B. When the cursor is located in a region of the left region at the left side of the peripheral region ZA, movement of the cursor is stopped before reaching the boundary line B1 so that the cursor cannot move over the boundary line B1 to screen B. In this case, the cursor located at the left side of the peripheral region ZA can be moved over the boundary line B1 to screen B by moving the cursor into the peripheral region ZA (touch is deactivated by releasing fingertip from detection surface) and then moving the cursor again from the inside of the peripheral region ZA over the boundary line B1.

FIG. 3 shows an example of a screen when operation subject movement cursor control is performed.

The display region 31 is divided into two regions located at the left and right sides of the plane of the drawing. The left region of the two regions displays a radio operation screen where operation subject movement cursor control is performed, and the right region of the two regions displays an air conditioner operation screen where operation subject movement cursor control is performed. When the cursor is located in the left region, movement of the cursor is controlled in the manner described below. For example, when the slider C1 that is most proximate to the boundary line B2 of the left region corresponds to the peripheral region ZC and the cursor (focus) is located on the slider C1, the cursor (focus) can move over the boundary line B2 to screen D. When the cursor (focus) is located in the left region at the left side of the slider C1, movement of the cursor (focus) is stopped before reaching the boundary line B2, that is, stopped at the slider C1, so that the cursor (focus) does not move over the boundary line B2 to screen D. In this case, when the cursor is located at the left side of the slider C1, the cursor is moved over the boundary line B2 to screen D by releasing a fingertip from the detection surface at the slider C1 and then moving the cursor again from the slider C1 over the boundary line B2.

Figure 4:
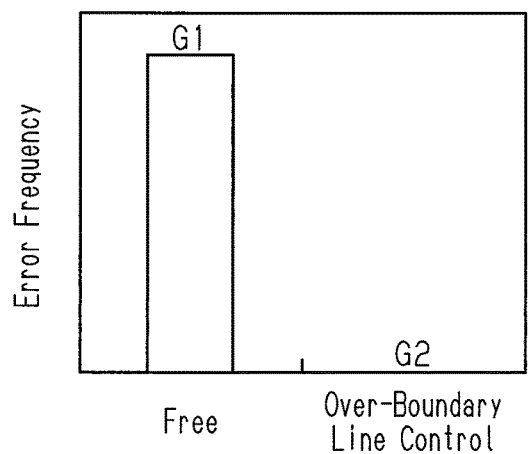
FIG. 4 is a graph showing decreases in the number of operation errors that occur in the vehicle display device of FIG. 1.

FIG. 4 is a graph showing an example when the number of operation errors that occur in cursor movement based on an operation of the touch pad 10 is counted as the error frequency. The operation error that occurs when the movement of the cursor, which is the condition that the over-boundary line control is applied to the vehicle display device of the present embodiment, is counted as the error frequency. More specifically, an icon switch located proximate to the boundary line is operated a number of times by moving the cursor located proximate to the center of the screen to near the boundary line. The operation error in which the cursor moves over the boundary is counted as the error frequency.

When conventional free cursor control is performed, the error frequency is high as shown in a graph G1. When the over-boundary line control of the present embodiment is performed, the error frequency is "0" as shown in a graph G2. Thus, in the vehicle display device of the present embodiment, the touch pad 10, which is located at a position spaced apart from the display 30, moves the cursor on the screen shown on the display 30 in an easy, quick, and ensured manner.

As described above, the vehicle display device of the present embodiment has the following advantages.

(1) If the cursor is located in the peripheral region ZA, which is part of screen A and includes the boundary, when the cursor is moved, the cursor is allowed to move to screen B. If the cursor is located outside the peripheral region ZA when the cursor is moved, the cursor cannot be moved out of screen A where the cursor is located. Thus, even when the user inaccurately moves the cursor, the cursor does not move out of screen A, which is what the user wants to operate. Accordingly, the user can continue screen operations while maintaining the operation feel and state of the screen. This limits inadvertent movement of the cursor between screens while also enabling free movement of the cursor between the screens.

(2) A particular operation allows the cursor to be moved out of the screen where the cursor is located. Thus, the cursor can be moved to another screen.

(3) For example, when the cursor is located in the peripheral region ZA, which is part of screen A, the cursor can be moved out of screen A. That is, movement of the cursor out of screen A is enabled. When the cursor is located in the peripheral region ZA of screen A and moved to a certain portion of screen A, the cursor is often moved toward the center of screen A. When the cursor is moved toward the center of screen A, erroneous movement of the cursor out of screen A seldom occurs. Thus, even when the user inaccurately moves the cursor, the cursor can easily be moved as intended by the user.

(4) The touch pad 10 is arranged in the vehicle at a position that allows for easy operation by the user. The touch pad 10 can be operated to reflect the relative positional relationship of the coordinates of the touch start point and the coordinates of the touch end point. That is, relative coordinates can be input to the touch pad 10 using the coordinates of the touch start point as a reference. Although the operation accuracy of the touch pad 10 tends to be low, the arrangement of the touch pad 10 improves the operability of the touch pad 10.

Further, the display 30 can be located at a position that is spaced apart from the touch pad 10 and easy to see.

(5) The degree of freedom for the movement of the cursor is high when the cursor is a free cursor and is movable to any position on the screen. A free cursor has a tendency to cause an erroneous operation when inaccurately moved. Nevertheless, inadvertent movement of the cursor to screen B is restricted even when the cursor is moved to the vicinity of the end of screen A where the cursor needs to be accurately moved so as not to be moved beyond the screen.

(6) Movement of the cursor on the screen sets a focus that indicates selected states of a plurality of operation subjects, that is, objects. Movement of the cursor moves the focus on the objects. Thus, even when the cursor is inaccurately operated, the focus is properly set on each object.

Other Embodiments

It should be apparent to those skilled in the art that the present invention may be embodied in many other specific forms without departing from the spirit or scope of the invention. Particularly, it should be understood that the present invention may be embodied in the following forms.

Display

In the above embodiment, the display 30 is located at the instrument panel 3 where the display 30 is easily seen. Instead, as long as the display can provide a user with screens that are easily seen by a user, the display 30 may have a meter panel, a rearview mirror, or the like display images.

In the above embodiment, the vehicle display device includes a single display 30. Instead, the vehicle display device may include a plurality of displays.

Figure 5:
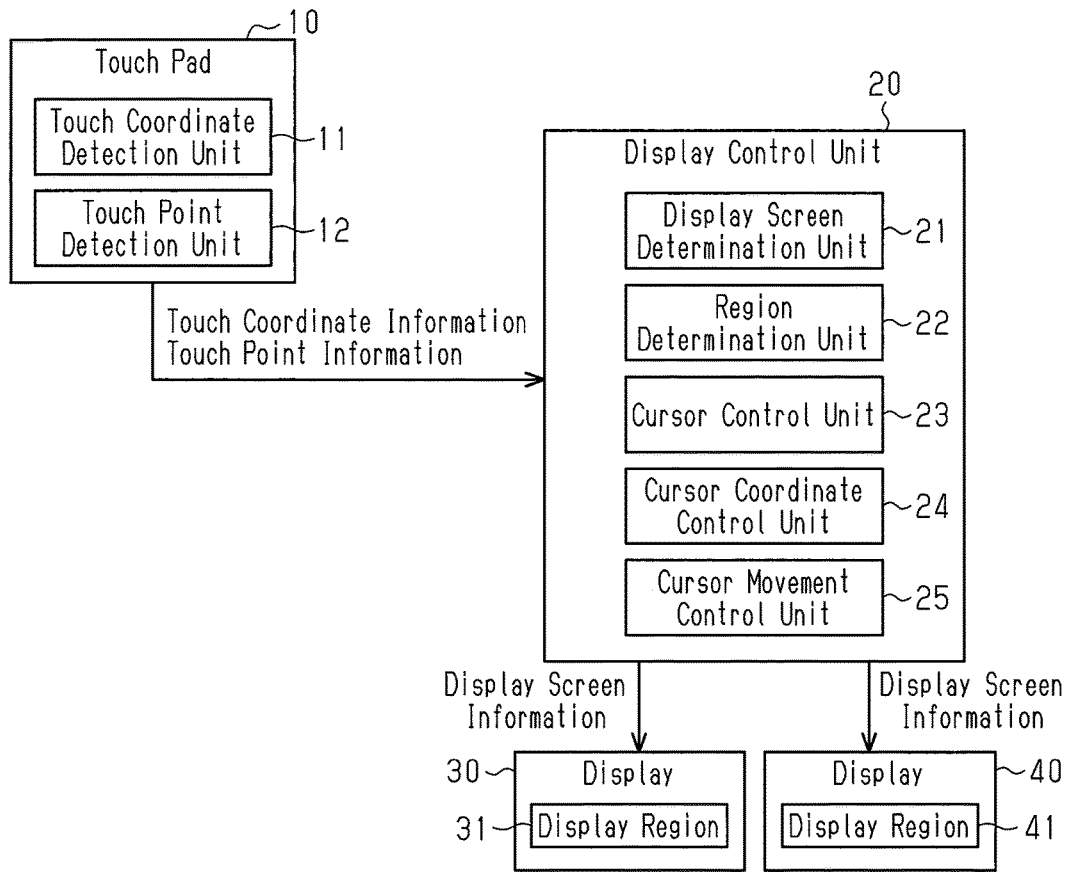
FIG. 5 is a schematic block diagram showing the configuration of another embodiment of a vehicle display device.

For example, as shown in FIG. 5, the vehicle display device may include two displays 30 and 40. When using the two displays 30 and 40, the cursor can be easily moved under the over-boundary line control. In this case, the end of a display region of each of the displays 30 and 40 is set as a boundary line, and a region including the boundary line is set as a peripheral region.

Thus, if the cursor is located in the peripheral region including the end when the cursor is moved, movement of the cursor to the other display is allowed. If the cursor is located outside the peripheral region when the cursor is moved, movement of the cursor out of the display where the cursor is located is restricted. Accordingly, even if the user inaccurately moves the cursor, movement of the cursor out of the screen that the user wishes to operate is restricted. This avoids situations in which the cursor suddenly disappears from the display that is being viewed by the user. Further, the user can continue screen operations while maintaining the operation feel and state of the screen.

Additionally, even when the vehicle display device includes three displays 30, 40 and 50 as shown in FIG. 6, a cursor can be easily moved by performing over-boundary line control.

As shown in FIG. 6, the touch pad 10 may be located in the center console 6 where the touch pad 10 can be easily operated with a fingertip by the user P who sits in the driver seat 2. Further, the three displays 30, 40, and 50 are located at positions where the displays 30, 40, and 50 can be easily viewed by the user P who sits in the driver seat 2. The display 30 may be located in the instrument panel 3, the display 40 may be located in the meter panel 4, and the display 50 may be located in a rearview mirror located at the inner side of a windshield glass 5.

Further, when the vehicle display device includes the displays 30, 40, and 50, over-boundary line control may be performed on cursor movement between the displays 30, 40, and 50.

For example, when the cursor is located in the display region 31 of the display 30, a boundary line is set around the display region 31 of the display 30 and a peripheral region is set at the inner side of the boundary line. When the movement of the cursor by the user is an operation that moves the cursor out of the display 30, the moved cursor no longer moves out of the display 30 where the cursor is located.

In the above embodiment, over-boundary line control is performed between a plurality of screens of a single display. Instead, under the condition that the movement of the cursor by the user is a particular operation that allows for movement of the cursor from the display where the cursor is arranged to another display, the cursor may be moved from the display where the cursor is arranged to the other display. In such a structure, movement of the cursor from the display where the cursor is arranged to the other display can be performed by the particular operation. That is, the movement of the cursor to the other display is ensured.

Over-boundary line control may be performed only between a plurality of displays instead of between a plurality of screens of each display.

Display Control Unit

In the above embodiment, the display control unit 20 divides the display region 31 of the display 30 into left and right regions and shows different screens in the divided regions. Instead, the display control unit may display a plurality of screens in the display region of the display so that the screens are slightly shifted apart from one another while overlapping one another. Alternatively, the display control unit may show a single screen and may show, near that screen, a preset screen of operation icon switches, that is, objects such as buttons. For example, when a plurality of screens are overlapped and a cursor is located in the frontmost screen, a boundary line needs to be set around the frontmost screen so that a peripheral region is set at the inner side of the boundary line.

In the above embodiment, the boundary line B1 or B2 is arranged between different screens that are adjacent to each other. Instead, the region determination unit may arrange a boundary line at any position on the screen. In this case, the display screen determination unit, the region determination unit, or the cursor movement control unit may even use screens, which have been a single screen, as two screens divided at a portion of the boundary line. For example, in accordance with the type of a displayed screen, the region determination unit may determine at which position the screen can be divided and set the boundary line at any position. Over-boundary line control may be performed for the set boundary line.

In the above embodiment, the peripheral region ZA has a predetermined width of 15 dots. Instead, as long as inadvertent movement of the cursor to another screen that would be caused by a user operation is limited, the predetermined width of the peripheral region may be less than or greater than 15 dots.

Communication Protocol

In the above embodiment, the communication protocol is a CAN protocol. Instead, as long as a message counter is used to ensure the reliability of a communication message, the communication protocol may be a communication protocol other than the CAN protocol, for example, ETHERNET (registered trademark) or FLEXRAY (registered trademark).

The present examples and embodiments are to be considered as illustrative and not restrictive, and the invention is not to be limited to the details given herein, but may be modified within the scope and equivalence of the appended claims.

The invention claimed is:

1. A vehicle display device comprising:
    a display comprising a first screen, a second screen, wherein the first screen includes a boundary region at a periphery of the first screen, wherein the display is configured to show the first screen and the second screen; and
    circuitry configured to control a position of a cursor on the first screen, on the second screen, and between the first and second screens in accordance with a movement of the cursor by a user, wherein the position of the cursor indicates an operation position on the display, wherein
    the circuitry is configured to move the cursor from the first screen to the second screen only if the cursor is started at the boundary region when the user performs an operation to move the cursor from the first screen to the second screen, and
    the circuitry is configured to restrict movement of the cursor from the first screen to the second screen only if the cursor is located outside the boundary region when the user performs an operation to move the cursor from the first screen to the second screen.

2. The vehicle display device according to claim 1, wherein
    a touch pad spaced apart from the display is connected to the display, and
    the movement of the cursor by the user is an operation performed on the touch pad.

3. The vehicle display device according to claim 1, wherein the cursor is a free cursor.

4. The vehicle display device according to claim 1, wherein a focus is set on one of a plurality of operation subjects located on the first and second screens in accordance with the movement of the cursor.

5. The vehicle display device according to claim 1, wherein the display is a first display, and the vehicle display device further comprises a second display, wherein
- the circuitry is configured to control a position of the cursor on the first display, on the second display, and between the first and second displays in accordance with movement of the cursor by the user,
- the circuitry is configured to move the cursor from the first display to the second display only if the cursor is started at a further boundary region located at an end of a screen shown on the first display when the user performs an operation to move the cursor from the first display to the second display, and
- the circuitry is configured to restrict movement of the cursor from the first display to the second display only if the cursor is located outside the further boundary when the user performs an operation to move the cursor from the first display to the second display.

6. A method for controlling a vehicle display device, the method comprising:
- showing a first screen, a second screen on a display, wherein the first screen includes a boundary region at a periphery of the first screen;
- controlling a position of a cursor on the first screen, on the second screen, and between the first and second screens in accordance with movement of the cursor by a user, wherein the position of the cursor indicates an operation position on the display;
- moving the cursor from the first screen to the second screen only if the cursor is started at the boundary region when the user performs an operation to move the cursor from the first screen to the second screen; and
- restricting movement of the cursor from the first screen to the second screen only if the cursor is located outside the boundary region when the user performs an operation to move the cursor from the first screen to the second screen, wherein
the display comprises a first screen and a second screen.

7. A vehicle display device comprising:
- a first display and a second display, each configured to display a screen; and
- circuitry configured to control a position of a cursor on the first display, on the second display, and between the first and second displays in accordance with movement of the cursor by a user, wherein the position of the cursor indicates an operation position on one of the first and second displays, wherein
- the circuitry is configured to move the cursor from the first display to the second display only if the cursor is started at a boundary region located at an end of the screen shown on the first display when the user performs an operation to move the cursor from the first display to the second display, and
- the circuitry is configured to restrict movement of the cursor from the first display to the second display only if the cursor is located outside the boundary when the user performs an operation to move the cursor from the first display to the second display.

* * * * *